Aug. 2, 1949.   U. LAMM   2,477,991
VOLTAGE REGULATING SYSTEM
Filed June 4, 1948
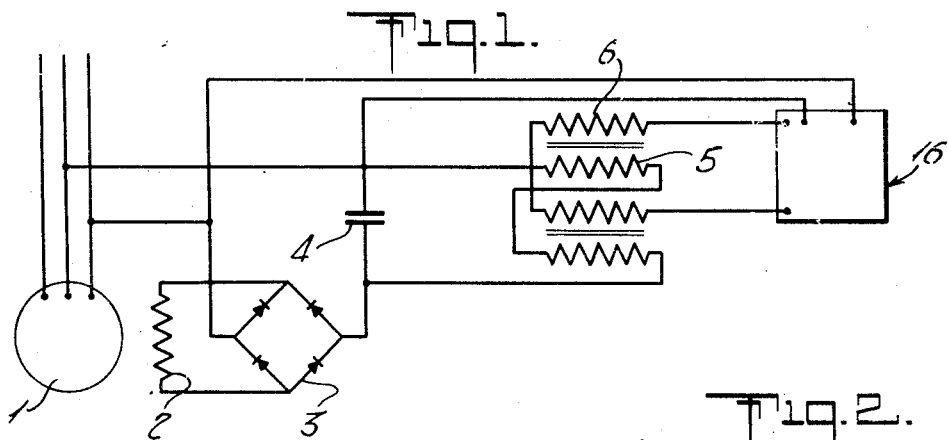
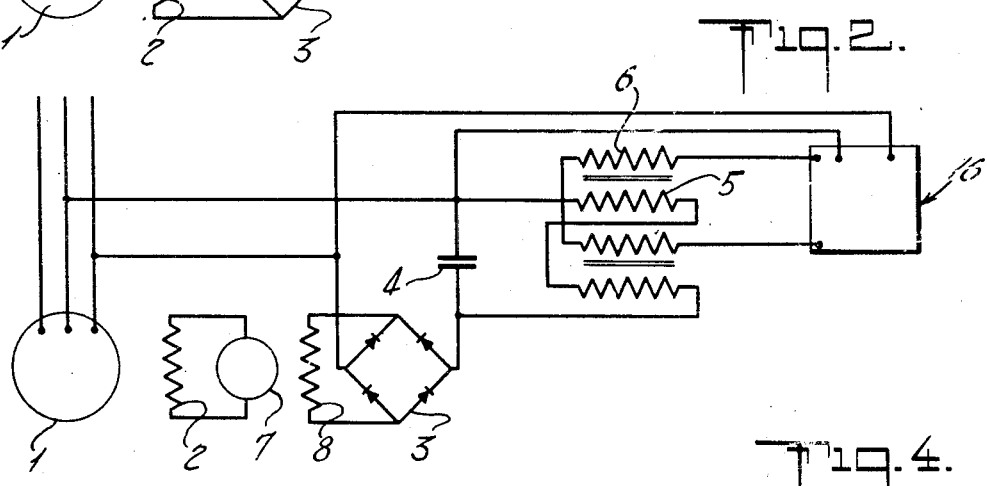
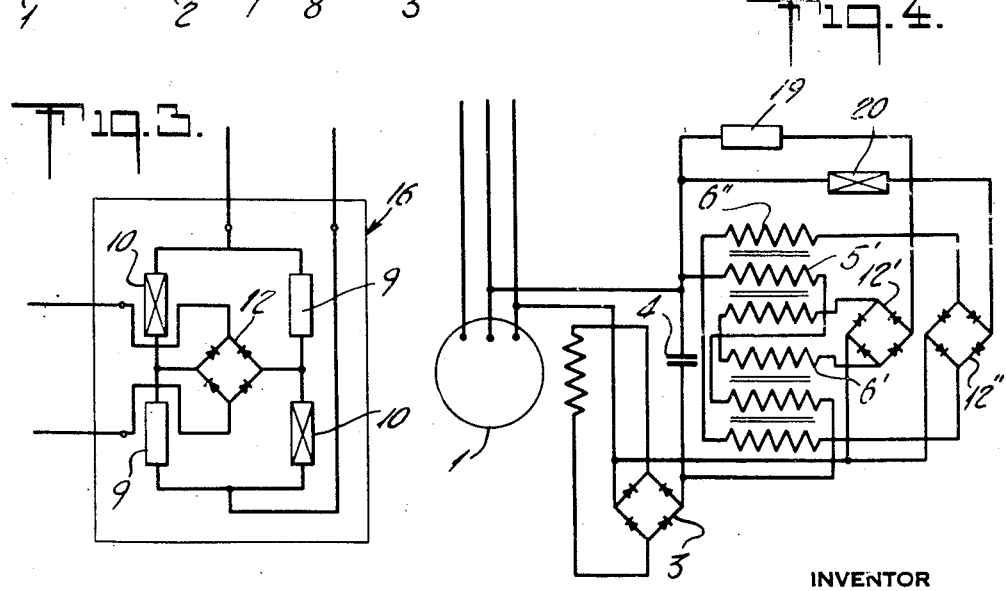
INVENTOR
Uno Lamm
BY
E. Ames Aiken
ATTORNEY Patented Aug. 2, 1949

2,477,991

UNITED STATES PATENT OFFICE 2,477,991

VOLTAGE REGULATING SYSTEM

Uno Lamm, Ludvika, Sweden, assignor to Allmanna Svenska Elektriska Aktiebolaget, Vasteras, Sweden, a Swedish corporation Application June 4, 1948, Serial No. 31,132

2 Claims. (Cl. 322—28)

1

The present invention relates to means for regulating the voltage of alternating current machines which are directly or indirectly excited from the alternating current terminals through rectifying means. By an indirect excitation I understand here that the rectifying means are used to excite a direct current machine which serves as an exciter of the alternating current machine and may be considered simply as an amplifier of the exciting action.

The invention is based upon the same general principle as that covered by the U. S. Patent 2,429,724 and by the co-pending application Serial No. 769,777, filed August 21, 1947, both in the name of Ulrik Krabbe and assigned to the same company as the present application. The said principle involves that the regulation is effected by means of a direct current saturable reactor in such manner that the current flowing through the alternating current winding of said reactor acts to oppose the excitation, whereby the machine will have the property of taking up voltage automatically and, further, the unavoidable magnetic inertia of the saturable reactor acts dynamically to accelerate the regulating action when a voltage change occurs.

According to the present invention, the said opposing action of the reactor current is obtained by connecting the alternating current winding of the reactor in parallel to a condenser, so that the vector sum of the currents through the condenser and the reactor, which in the case of a pure condenser and a pure reactor, will mean the arithmetical difference between their currents, will determine the excitation. The condenser current should be the major one, so that the excitation current will be the condenser current minus the reactor current. This differential current is rectified and serves to excite the alternating current machine or an exciter therefor.

Two examples of diagrams of connections embodying the present invention are illustrated in Figs. 1 and 2 of the accompanying drawing, while Fig. 3 shows a particular form of a detail, and Fig. 4 shows another modified diagram.

Referring to Fig. 1, 1 is an alternating current generator, shown, by way of example, as a three phase generator and provided with an exciting winding 2. This winding is fed from the direct current terminals of a rectifier 3. One of the alternating current terminals of the said rectifier is directly connected to one alternating current terminal of the machine 1, while the other alternating current terminal of the rec-

2 tifier is connected to another alternating current terminal of the machine through means containing in parallel a condenser 4 and the alternating current winding 5 of a direct current saturable reactor having a direct current saturating winding 6. This latter winding is fed from a regulator 16 which is shown purely conventionally in Fig. 1, as it may be of any known type, while one form of such a regulator is shown in detail in Fig. 3. The regulator acts to increase the saturating direct current of the reactor 5 when the voltage of the machine increases.

The operation of the exciting means described is substantially as follows: Supposing the voltage of the machine is increased above its normal value, for instance by a sudden decrease of its load, the regulator acts to force an increased saturating current through the winding 6. This acts to increase the current through the winding 5, but, as this current is vectorially opposed to the condenser current which undergoes a smaller variation than the reactor current, the resultant current will be reduced. This resultant current is rectified in the rectifier and feeds the exciter winding 2 of the machine 1, the excitation current of which is thus reduced so as to restore the voltage of the said machine to its normal value.

At the first instant of a rise of voltage of the alternating current machine, the condenser current rises in proportion to the voltage, but the reactor current arises more rapidly on account of the increased alternating current flux of the reactor, and of its magnetic inertia, which appears on rapid changes of the direct current saturation. The vectorial sum of both, which is practically identical to their arithmetic difference, therefore decreases and so does the excitation of the machine. Analogously, when the machine voltage is lowered, the condenser current is lowered in proportion to the voltage, but the reactor current is lowered more than proportionally, and therefore the resultant current is increased. The parallel connection of the condenser and reactor thus acts to oppose a change of voltage already at the first instant, while the magnetic inertia of the direct current saturating winding prevents the alternate action of the regulator which always can be set to keep the voltage constant.

The connections of Fig. 2 are similar to those of Fig. 1 except that the resultant current of the condenser 4 and the reactor winding 5 does not directly excite the alternating current machine but excites an exciter 7 therefor. The exciter 7 has an excitation winding 8 which is traversed by the resultant current of the members 4 and 5, and the exciting winding 2 of the main machine is connected to the armature terminals of the exciter. The operation will be substantially analogous to that of Fig. 1, the exciter simply acting as an amplifier of the exciting system. Still further amplifying steps may, of course, be introduced without departing from the scope of the present invention.

Fig. 3 shows, in detail, an example of the regulator proper which, however, may be of any appropriate kind. According to Fig. 3, the voltage of the main machine traverses a bridge connection containing, in two opposite sides 9, constant impedances and, in the two remaining opposite sides 10, voltage dependent impedances, for instance saturable iron core reactors. For a certain normal voltage, the difference between said impedances will force a current through the bridge load 11, which, after being rectified in the rectifier 12, is just sufficient to saturate the reactors 5, 6 sufficiently to give the necessary exciting current for this normal voltage. When the voltage rises, this will give an increased bridge current which raises the saturation of the reactors 5, 6 and thereby reduces the exciting current so as to restore the normal voltage value.

Instead of using a single saturating winding 6 on the reactor 5 traversed by a bridge current, the same result may be accomplished in a well-known manner by using two opposing windings on the reactor traversed by currents which vary in different manners with the impressed voltage. This modification is shown in Fig. 4 in which one of the two opposing saturating windings is designated by 6' and the other by 6''. The winding 6' is fed from a rectifier 12' which is fed, on the alternating current side, through a constant impedance 19, while the winding 6'' is fed from a rectifier 12'' which is fed on the alternating current side through a voltage dependent impedance 20, both from the alternating current voltage of the machine 1. This combination of two opposing saturating windings fed from the same voltage across impedances of different character is well-known per se and does not form part of this invention.

I claim as my invention:

1. A voltage regulating system comprising an alternating current machine having terminals, exciting means therefor, a condenser, a direct current saturable reactor, means for feeding said exciting means from said machine terminals through said condenser and said direct current saturable reactor in parallel, and means for regulating the saturating direct current of said reactor in dependence on the voltage of said machine.

2. A voltage regulating system comprising an alternating current machine having terminals, exciting means therefor, a condenser, a direct current saturable reactor, means for feeding said exciting means from said machine terminals through said condenser and said direct current saturable reactor in parallel, said condenser admitting under normal voltage a larger current than said reactor, and means for regulating the saturating direct current of said reactor in dependence on the voltage of said machine.

UNO LAMM.

No references cited.